United States Patent [19]

Rangel

[11] 4,337,559
[45] Jul. 6, 1982

[54] ROD END AND A METHOD AND APPARATUS FOR THE MANUFACTURE THEREOF

[75] Inventor: Edward Rangel, Aurora, Ill.

[73] Assignee: Heim Universal Corporation, Fairfield, Conn.

[21] Appl. No.: 281,741

[22] Filed: Jul. 9, 1981

Related U.S. Application Data

[63] Continuation of Ser. No. 778,820, Mar. 17, 1977, abandoned, Continuation of Ser. No. 958,921, Nov. 8, 1978, abandoned, Continuation of Ser. No. 106,425, Dec. 21, 1979, abandoned.

[51] Int. Cl.³ .................. B21D 53/10; F16C 23/04
[52] U.S. Cl. .................. 29/149.5 B; 29/149.5 DP; 308/72
[58] Field of Search .................. 308/23, 72, 236; 29/149.5 B, 149.5 DP; 403/122, 127, 137

[56] References Cited

U.S. PATENT DOCUMENTS

| | | | |
|---|---|---|---|
| 2,952,901 | 9/1960 | King | 29/149.5 B |
| 3,068,551 | 12/1962 | Cobb | 29/149.5 B |
| 3,118,711 | 1/1964 | Bachelet et al. | 308/236 |
| 3,163,475 | 12/1964 | Litsky | 308/72 |
| 3,581,361 | 6/1971 | Loubier | 29/149.5 B |
| 3,639,961 | 2/1972 | Shiftlet | 29/149.5 B |
| 3,662,462 | 5/1972 | Shiftlet | 29/149.5 B |
| 3,700,295 | 10/1972 | Butzow et al. | 308/72 |

*Primary Examiner*—Richard R. Stearns
*Attorney, Agent, or Firm*—James C. Wray

[57] ABSTRACT

A rod end bearing is disclosed which comprises a spherical ball, a raceway and a supporting body. The raceway and the body are joined by body material being upset to engage chamfered surfaces at the outer extremities of the raceway. The method includes the steps of forming the raceway and upsetting body shoulders into the chamfers of the raceway.

3 Claims, 8 Drawing Figures

ROD END AND A METHOD AND APPARATUS FOR THE MANUFACTURE THEREOF

This is a continuation of abandoned parent applications, Nos. 778,820, filed Mar. 17, 1977; 958,921, filed Nov. 8, 1978, and 106,425, filed Dec. 21, 1979.

BACKGROUND OF THE INVENTION

Rod end bearings are known in the art and generally comprise the combination of a spherical ball having a central cylindrical opening to support a shaft and the like, a raceway for the ball and a rod end body for supporting the raceway with its spherical ball. The usual rod end is so constructed to accomodate some degree of misalignment of the part supported by the central opening of the ball.

One method for manufacturing a rod end bearing is to deform a cylindrical sleeve around a portion of the spherical ball to form a raceway, and thereafter machining the outer surface of the bearing to provide a cylindrical configuration. The spherical ball and a raceway sub-assembly is then inserted in a suitable rod end body, after which the raceway and the rod end body are connected. Another method is to form the raceway and join the parts in one operation, as taught by King U.S. Pat. No. 2,952,901.

In one process, metal of the raceway is deformed into chamfers formed on the bore of the body. This can be accomplished as disclosed in U.S. Pat. No. 3,662,462 issued to Robert H. Shiflet on May 16, 1972. One species in this patent requires a groove to be provided in the raceway. Another alternative taught by the patent is to upset metal from a housing or a support into chamfers on the raceway.

THE INVENTION

According to the invention herein, a rod end bearing is manufactured by inserting a ball with a cylindrical opening into a cylindrical sleeve having an axial length less than the axial length of the ball opening, swaging the sleeve over the ball to form a raceway for the ball, machining the outer portion of the raceway to provide a cylindrical surface of a predetermined diameter, machining chamfers at the extremities of the machined cylindrical surface, inserting the ball and machined raceway into the opening of a rod end body having axially extending shoulders extending beyond the sides of the raceway, the shoulders providing an axial extension of the rod end body opening, and thereafter swaging the shoulders inwardly toward the ball and raceway and into the chamfers to fixedly position the ball and raceway in the body opening. Generally, in the preferred embodiment, the shoulders extend from about 0.020 to 0.040 inch and preferably about 0.027 and 0.035 inch beyond the respective sides of the major portion of the body.

The process herein described and the article so produced has proved extremely satisfactory in use. One important result stems from the particular steps and configuration, i.e., the ability to adjust the fit of the ball in the race during the manufacturing steps or thereafter to tighten the fit of the ball in the raceway after a period of use. This is accomplished during manufacture by gauging the fit and controlling the swaging force to swage the shoulders into the chamfers. After the bearing is manufactured or after a period of use, the fit is adjusted by applying forces to the swaged shoulders usually in a swaging die similar to the die used during the manufacture of the bearing.

THE DRAWINGS

DETAILED DESCRIPTION

Figure 1:
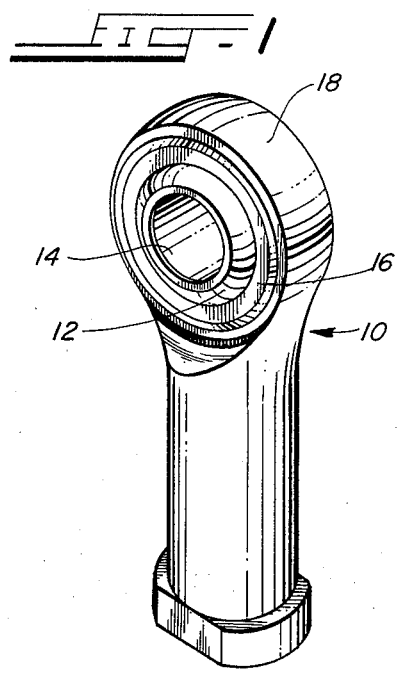
FIG. 1 is an illustration of a rod end bearing of this invention.
Figure 7:
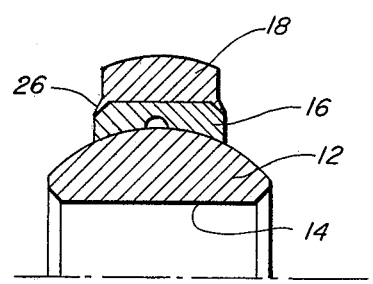
FIG. 7 is a partial section through the bearing of FIG. 1.

Looking now at FIGS. 1 and 7 of the drawing, there is illustrated a rod end bearing of this invention, generally identified as 10 which comprises a ball 12 having an axial cylindrical opening 14 therethrough, a raceway 16 for the ball 12 which permits relative movement between the ball and the raceway, and a rod end body 18. The raceway 16 is provided with chamfers 20,20 and metal from the rod end body is swaged into engagement with the chamfers to fixedly lock the raceway and the body together.

The steps of the process for producing the bearing of FIG. 1 are illustrated in FIGS. 2 to 6, to which attention is invited.

Figure 2:
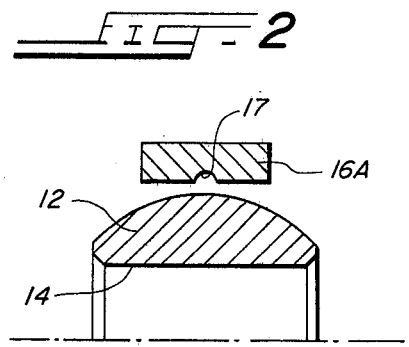
FIGS. 2 to 6 are illustrations of the manufacturing steps to produce a rod end bearing according to this invention.
Figure 3:
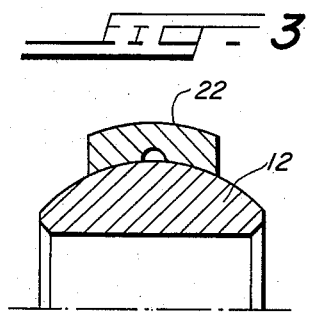
Figure 4:
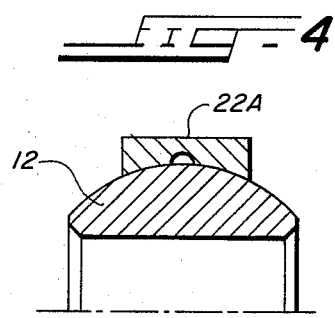
Figure 5:
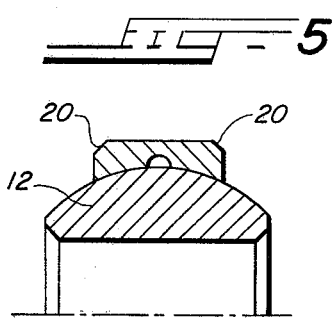
Figure 6:
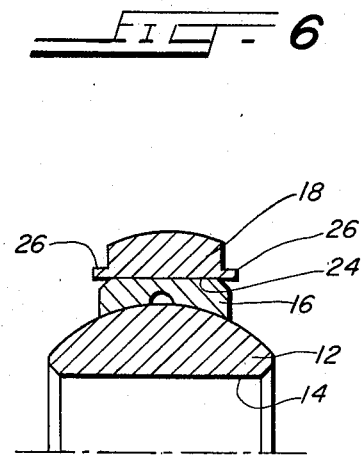

In FIG. 2, a preformed ball 12 with a cylindrical opening 14 is inserted in a cylindrical sleeve 16A. The sleeve 16A is subjected to a forming or swaging operation to form the raceway 16 for the ball. Rod end bearings which are to be lubricated are provided with an annular groove 17 in the sleeve 16A. The formed outer surface 22 of the raceway is generally spherical as illustrated in FIG. 3. This outer surface 22 is then machined (see FIG. 4) to present a cylindrical surface 22A. Thereafter, (or at the same time), the raceway 16 is machined to provide chamfers 20,20 at the axial extremities, see FIG. 5. The machined ball-raceway sub-assembly is then assembled into a rod end body 18 having a cylindrical opening 24 and axially extending shoulders 26,26 serving as continuations for the opening 24, see FIG. 6. The shoulders 26,26 extend about 0.020 to 0.040 inch and preferably 0.027 to 0.035 inch beyond each side of the major portion of the body. The shoulders 26,26 are swaged into the chamfers 20,20 to provide the assembly of FIGS. 1 and 7.

Figure 8:
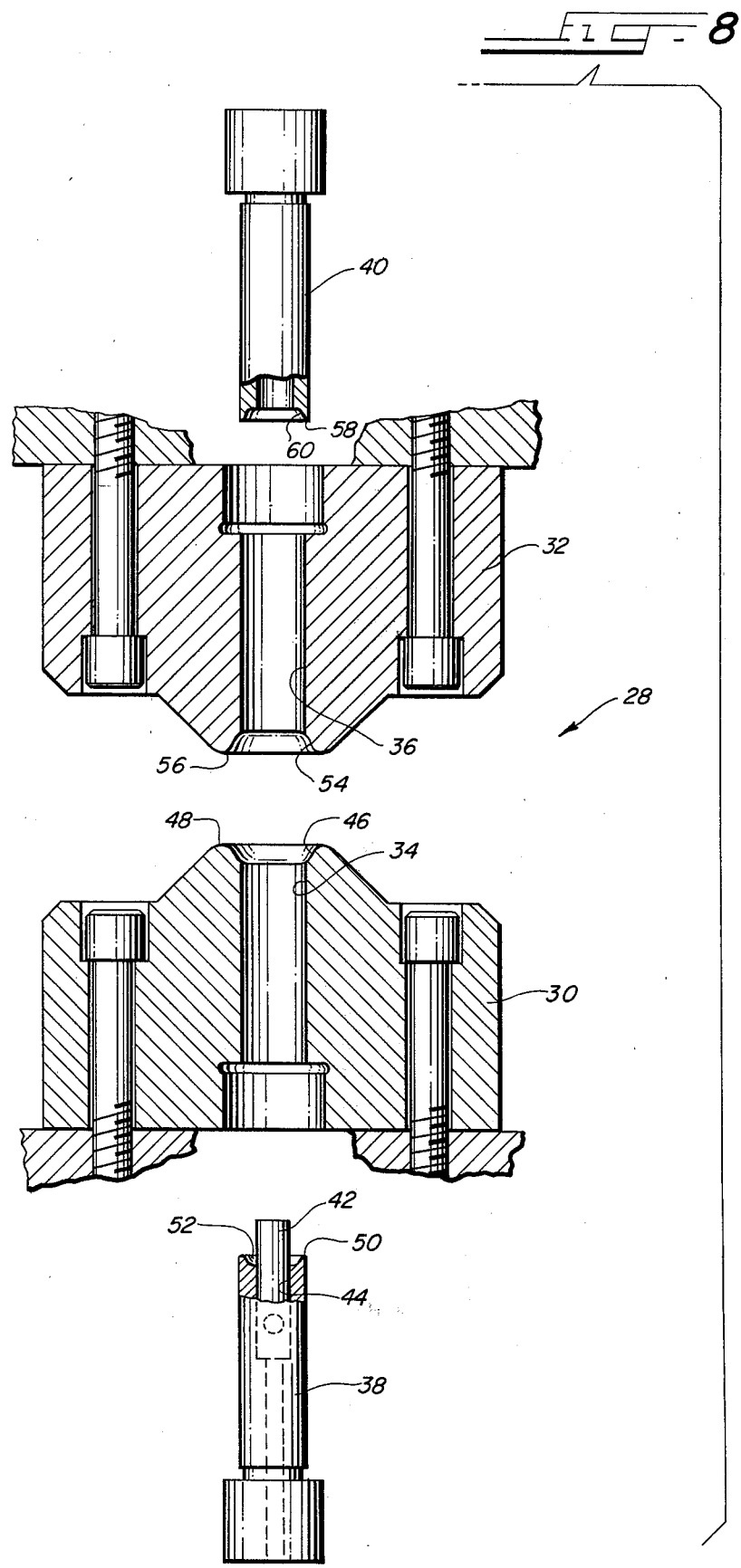
FIG. 8 is an illustration of a die means for swaging the rod end housing to the raceway.

Attention is now invited to FIG. 8 which illustrates a die means 28 for swaging the rod end body shoulders 26,26 into the chamfers 20,20. The die means comprises a lower die 30 and an upper die 32 each having a central opening 34 and 36, respectively, to receive a pin 38,40, respectively. The pin 38 for the lower die 30 is provided with a pilot member 42. The pilot member 42 fits in a counter bore 44 in the pin 38. The die 30 has a central conical upper portion defined by a concave toroidal surface 46 and terminating in a rim 48 flanking the opening 34. The pin 38 has an upper portion defining a rim 50 and an annular cavity 52. The pilot member 42 serves as a locator for the sub-assembly of the ball and raceway 12 and 16, the pilot member 42 fitting in the opening 14. The ball rests in the cavity 52 with the raceway edges being supported on the rim 50. The upper die 32 is similar in shape to the lower die 30 with a central conical upper portion defined by a concave toroidal surface 54 and a rim 56; the top pin 40 is configured in a similar manner to the lower pin 38, i.e., with a rim 58 and a cavity 60, but need not be provided with a pilot. The dies 30 and 32 are connected to suitable platens of a press by bolts or other fastening means.

The shoulder 26,26 of the rod end body contact the concave toroidal surfaces 46 and 54 and by application of suitable pressure, the shoulders are swaged into the chamfers 20,20.

Control of the swaging pressure used to deform the shoulders 20,20 can control the fit of the ball in the raceway because the swaging pressure can cause movement of the raceway material, thus changing its configuration and its fit with the ball.

When, after a period of use of a rod end, the ball becomes tight and difficult to move in its raceway, it can be concluded that foreign material, such as dirt, has entered between the ball and the raceway. Cleaning of the bearing is then required. Wear of the bearing is indicated by loosening of the ball in the raceway-one way of indication is end-play of the ball. This can be corrected in a bearing made according to this invention by placing the bearing in suitable forming dies similar to those used during the manufacture of the bearing and applying swaging force to the upset shoulders, thus adjusting the fit to that desired and/or restoring the fit to that as manufactured.

What is claimed is:

1. A method for manufacturing rod ends, each of which comprises a rod end body, a race and a ball, said ball having a cylindrical opening, the steps comprising:

inserting said ball in a cylindrical sleeve having an axial length less than the axial length of said ball opening;

swaging said sleeve over said ball to form a raceway for said ball, said raceway having an inner surface substantially conforming to the outer surface of at least a portion of said ball and a generally spherical outer surface;

machining the outer portion of said raceway to provide an outer cylindrical surface having a diameter of a predetermined size;

machining the extremities of said cylindrical outer surface of the raceway to provide chamfers at the terminal ends thereof;

forming on a rod end body axial shoulders extending beyond sides of said body and providing opposite axial extensions of said rod end body about a cylindrical body opening extending through the body, the body opening having a diameter commensurate with the diameter of the outer cylindrical surface of the raceway;

inserting said ball and machined raceway into the opening of a rod end body;

swaging said axially extending shoulders inwardly toward said ball and raceway and into said chamfers thereby fixedly securing said ball and raceway in said body opening;

using the rod end bearing until loosening of the ball in the raceway is experienced, adjusting fit of the ball in the raceway by reswaging the shoulders inwardly toward said ball and said raceway and into the chamfers by applying forces to the swaged shoulders of the raceway in a swaging die and causing movement of material of the raceway thereby adjusting and restoring fit.

2. A method as recited in claim 1 in which each shoulder has a length of 0.020 to 0.040 inch.

3. A method as recited in claim 2 in which each shoulder has a length of 0.027 to 0.035 inch.

* * * * *